Aug. 12, 1924.                                                          1,504,342
F. HAUBER
METAL PACKING FOR PISTON RODS
Filed Feb. 7, 1923
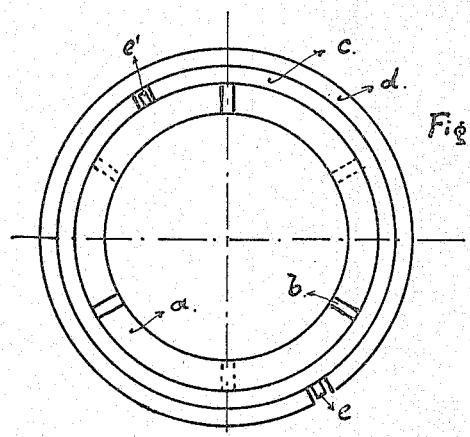
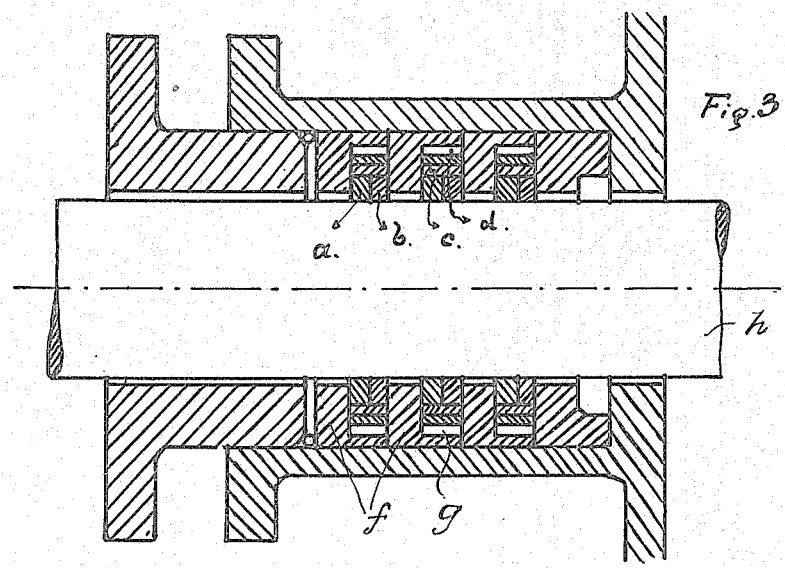
Inventor
F. Hauber,
By Marks & Clerk
Attys.

Patented Aug. 12, 1924.

1,504,342

UNITED STATES PATENT OFFICE.

FRANZ HAUBER, OF VIENNA, AUSTRIA.

METAL PACKING FOR PISTON RODS.

Application filed February 7, 1923. Serial No. 617,590.

*To all whom it may concern:*

Be it known that I, FRANZ HAUBER, a citizen of the Republic of Austria, residing at V. Anzengrubergasse 2, Vienna, Austria, have invented Improvements in Metal Packing for Piston Rods, of which the following is a specification.

In order to provide an effective packing for preventing the working medium in the cylinder of a steam engine or the like from escaping, sectional packing rings which fit snugly on the piston rod, are generally employed. These rings are pressed in a known manner against the rod to be packed by a spiral spring or by separate springs which surround the sectional rings.

In order to prevent these rings, which are held together only by the tightening spring, from being forced open by the gas or fluid pressure in the cylinder, it is necessary to cause the springs, which provide the pressure, to act on the sections of the rings with a pressure approximately equal to the pressure medium in the cylinder, thus causing great friction of the packing rings on the piston rod and considerable wear on the rings.

The object of the present invention is to furnish a packing which will overcome these disadvantages.

The improved packing is illustrated in the accompanying drawing in which:

Figure 1 is a diametrical sectional view of the improved packing.

Fig. 2 is an end view of the same.

Fig. 3 is a longitudinal sectional view of a stuffing box containing the improved packing.

In the drawing, $c$ and $d$ are split contractile rings sprung over two rings $a$ and $b$, each formed of three parts, which rest on the piston rod $h$ to be packed. The spaces between the sections of the inner rings $a$ and $b$ are staggered in such manner that steam or the like is prevented from passing through the same. The split portions of the two resilient outer rings, which slip over the inner rings are relatively displaced through approximately 180°, for the purpose of offering effective resistance to the forcing open of the rings through the steam penetrating between the piston rod and the rings $a$ and $b$. Owing to the joints of the outer rings being relatively displaced at about approximately 180°, the ring $d$, which is sprung over the first ring, will, by holding the ends of the latter together, offer a great resistance to the opening of the ring $c$, as it prevents the outward movement of the ends of the ring $c$ by acting on said ends with great leverage. The rings $c$ and $d$, can be held in their relative positions to one another and to the packing rings $a$ and $b$ by pins $e, e'$ and the like.

It may be seen that the packing rings $a$ and $b$ and the inwardly springing cover rings $c$ and $d$ are mounted in abutting relation and are radially movable in the chamber rings $f$ of Fig. 3, so that the pressure medium cannot pass behind the cover rings $c$ and $d$, into the chamber $g$. Opening up of the packing is thus prevented by the inwardly directed resiliency of the rings $c$ and $d$, in such manner that the pressure on the piston rod $h$ and hence the friction arising is substantially less than in known stuffing box packing.

For accomplishing this result the cover rings $c$ and $d$ must be of resilient material, and the ends thereof must be displaced to a great extent. The best results are obtained with a displacement of exactly 180°, said displacement being maintained by means of pins $e$, $e'$ and the like.

When the packing has to withstand great pressures, the number of outer rings $c$ and $d$ may be increased, but they should always have their ends approximately diametrically opposite to another to obtain the best results.

What I claim is:

1. The combination with a stuffing box chamber and a piston rod extending through the same, of a segmental ring arranged in the chamber and bearing on the piston rod, a plurality of relatively strong, resilient springs sprung over the segmental ring and each split transversely at one point only in its periphery, the split portion of each spring being displaced at about 180 degrees relatively to the split of the other spring, and said resilient springs forming the only means for offering great resistance to the opening of the whole packing by the working medium.

2. A combination as claimed in claim 1 in which the segmental ring consists of a plurality of annular sections arranged side by side, each section consisting of a plurality of segments.

3. A combination as claimed in claim 1 including a projection on one of the springs engaging the other spring for preventing the springs from shifting circumferentially relatively to one another.

4. A combination as claimed in claim 1 including a projection extending from said segmental ring and engaging one of the springs to prevent relative circumferential movement of the last mentioned spring and said segmental ring.

5. The combination with a stuffing box chamber and a piston rod extending through the same, of a plurality of segmental rings arranged side by side in the chamber and bearing against the piston rod, a relatively strong resilient split ring surrounding the segmental ring and bearing against the latter for holding the segments against the rod, interlocking means for preventing the split ring from shifting circumferentially relatively to the segmental rings, an outer relatively strong resilient split ring sprung over the inner split ring and having its split portion displaced about 180 degrees relatively to the split portion of the inner ring, and interlocking means between the split rings for preventing the outer ring from shifting circumferentially relatively to the inner ring, said resilient rings forming the only means for offering great resistance to the forcing open of the whole packing by the working medium.

In witness whereof I have hereunto signed my name in the presence of two subscribing witnesses.

FRANZ HAUBER.

Witnesses:
  YUGO REIK,
  CARL WUSTENBERG.